June 7, 1966   L. E. WOLINSKI   3,255,099
SURFACE TREATMENT OF POLYMERIC SHAPED STRUCTURES
Filed Oct. 21, 1963
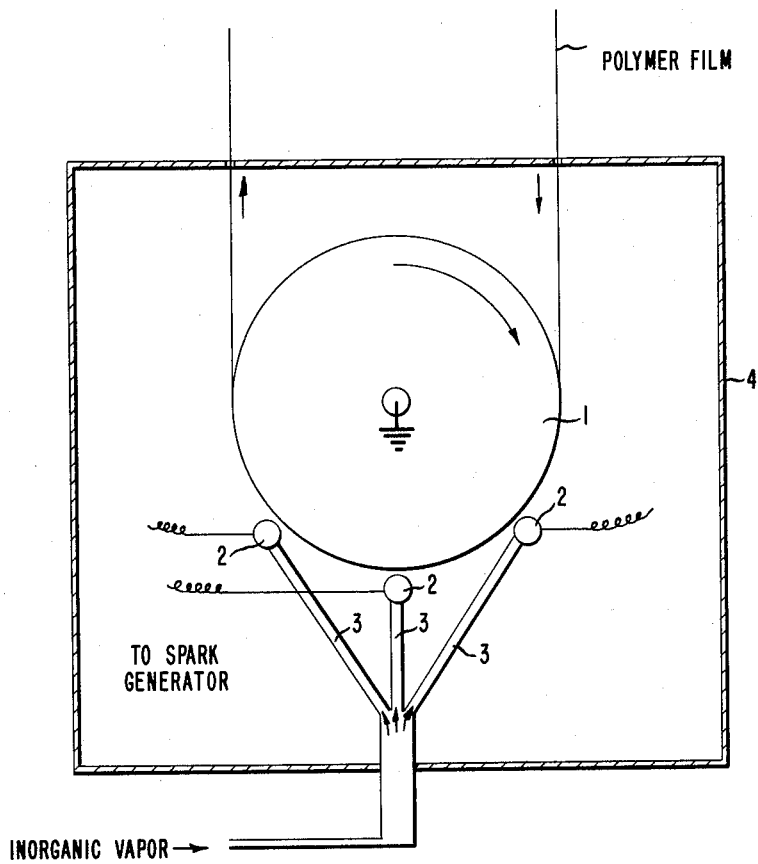
INVENTOR
LEON EDWARD WOLINSKI
BY
ATTORNEY United States Patent Office 3,255,099
Patented June 7, 1966

3,255,099
SURFACE TREATMENT OF POLYMERIC SHAPED STRUCTURES
Leon E. Wolinski, Buffalo, N.Y., assignor to E. I. du Pont de Nemours and Company, Wilmington, Del., a corporation of Delaware
Filed Oct. 21, 1963, Ser. No. 318,774
5 Claims. (Cl. 204—169)

This application is a countinuation-in-part of my copending application Serial No. 92,329, filed February 28, 1961, now abandoned.

This invention relates to polymeric shaped structures and more particularly to a process for improving the surface properties of organic polymeric shaped structures, and to the products so improved.

The surface characteristics of polymeric shaped structures have an important bearing on their capabilities for being utilized in various commercial applications. For example, fluorocarbon polymers are well known for their resistance to most chemicals and solvents and as a consequence they are well suited for use as liners for pipes and vessels in which corrosive chemicals are transported or stored. However, these polymers suffer from an extremely low degree of adherability to all materials including low adherability to other fluorocarbon polymeric structures.

It is frequently desirable to apply a suitable dyestuff to the surface of such films as those made from polyvinyl fluoride, "Mylar"[1] polyester film or polyvinyl chloride polymers and copolymers, but it is observed that common dyestuffs have very low affinity for the surfaces of such shaped structures as these.

It is well known that films such as those from regenerated cellulose attain much greater utility through the application of suitable coatings to impart moisture-proofness, resistance to the passage of organic vapors and heat sealability. At present, it is necessary to provide various anchoring treatments, such as impregnation of the base sheet with reactive thermosensitive resins to afford adequate adhesion of the coatings to the base sheet. A simple means for achieving adherability of coatings would be most desirable.

In the case of polyolefin films, such as those from polyethylene, it is known to improve the adherability to various other substances such as adhesives, printing inks and the like by an electric discharge treatment. However, films not treated in this way, as well as those which have been treated, suffer from inadequacy of surface slip and, in some instances, heat sealability.

Many of the polymer films illustrated above have a strong propensity toward accumulation of static which leads to difficulties in subsequent processing operations incident to their various applications.

It is therefore an object of this invention to provide a simple and effective treatment which can be applied to the surface of polymeric shaped structures to afford improvements in surface properties in these diverse respects and to thus provide polymeric shaped structures of enhanced usefulness.

A more specific object of this invention is to provide a continuous and economically attractive process for surface treatment for polymer films whereby to modify and to improve the surface characteristics of said films, and thus provide films of enhanced utility. These and additional objects will more clearly appear from the description which follows.

The foregoing and related objects are realized by the present invention which, briefly stated, comprises subjecting the surface of a polymeric shaped structure to the action of an electrical discharge at substantially atmospheric pressure between spaced electrodes in a gaseous atmosphere consisting essentially of the vapor of an inorganic agent having an affinity for electrons and having a vapor pressure of at least one millimeter of mercury at 60° C., said electrical discharge having an average energy level below 15 electron volts.

In the preferred embodiment of this invention, illustrated diagrammatically in the accompanying drawing, a continuous web of preformed, self-supporting organic polymer film, e.g., a continuous, self-supporting film of polyvinyl fluoride or of a copolymer of tetrafluoroethylene and hexafluoropropene, is passed continuously between a set of spaced electrodes consisting of a rotating metal roll 1 which is connected electrically to ground and one or more stationary hollow metal tubes 2 disposed parallel to the longitudinal axis of the roll and spaced a distance of from 0.03 to 0.125 of an inch from the surface thereof. The tubes are each connected electrically to a suitable power source (not shown) which supplies an alternating (or pulsating direct) current at the required intensity at the required voltage and frequency. A gaseous atmosphere consisting essentially of the vapor of the inorganic agent as the sole active agent either alone or admixed with a suitable carrier gas, such as nitrogen or carbon dioxide, is fed continuously to the hollow interior of the electrode tubes and issues from the tubes, through suitable openings therein, at the gap between each tube and the roll. The electrical discharge takes place in the atmosphere containing the inorganic vapors. The vapors may also be introduced into the reaction zone through one or more tubes separate from the electrode assembly. The assembly just described is suitably enclosed in a chamber 4, held at substantially atmospheric pressure and provided with the necessary openings to facilitate maintenance of the vapors of the inorganic agent or inorganic agent/carrier gas mixture therein and to permit controlled exhaust of the vapors therefrom to minimize operational hazard.

In carrying out the surface treatment of this invention, the potential difference between the electrodes (e.g., the hollow tube and the rotating roll) may vary from low voltages in the order of 1,000 volts up to pulsating peak voltages of 100,000 and above. In general, however it is preferred to maintain the voltage in excess of 2000 to 3000 volts. Frequencies from 350 cycles per second up to 500,000, or more, cycles per second can be used. Frequencies in the range of 300,000 to 500,000 cycles are preferred in order to obtain effective treatment at commercially acceptable exposure times.

In general, the effectiveness of the treatment increases with increase in amount of current to the electrodes for a given area of electrode and time of exposure. Current to the electrodes may range up to 5.5 R.M.S. (root mean square) amperes or higher. However, it is preferred to operate in the range of 0.3 R.M.S. ampere to 3.5 R.M.S. amperes to give reasonable treating times on the one hand, and to avoid rapid degradation of the electrodes at too high currents on the the other hand. Power to the electrodes may range from 10 watts per lineal inch of the electrode length to 100 watts per lineal inch of the electrode length. The electrical discharge employed herein, operating within the parameters above specified, has an energy level below 15 electron volts, and is not to be confused with the high or intermediate energy irradiations heretofore used to treat polymeric surfaces.

Time of exposure to the electric discharge treatment is not especially critical and effective treatments are realized at exposure times as short as $1 \times 10^{-5}$ seconds, and no adverse effects are noted at times as long as 60 seconds. Even longer exposure times can be employed ---
[1] Du Pont trademark.

although, for economic reasons, exposure times as short as possible consistent with effective treatment would normally be employed. Preferably the time of exposure of the polymeric surface to the electric discharge treatment should be at least $4\times10^{-4}$ seconds.

The electrodes are prefeably spaced from about 0.03 inch to about 0.125 inch apart. However, useful results can be obtained when the electrode gap is as low as 0.015 inch or as much as 0.25 inch provided suitable adjustments in such features as amount of current, electrode dimension and exposure time are made.

Satisfactory results have been obtained by passing the carrier gas or carrier gas/inorganic vapor mixture into the electrodes at rates up to 10 cubic feet per minute and acceptable results were obtained at gaseous flow rate as low as one-half cubic foot per minute. No adverse effects have been observed in the use of higher flow rates, though again economic considerations would dictate against the use of amounts exceeding those required to produce the desired effect.

Any inorganic agent having a vapor pressure of at least one millimeter of mercury at 60° C., and which has an affinity for electrons may be employed for purposes of this invention. Thus, inorganic oxidizing agents and coordination agents having a sufficient vapor pressure to be volatilized and transported into the electrode gap zone, are examples of general classes of agents which may be used. As representative specific agents there may be mentioned boron trifluoride, aluminum trichloride, aluminum tribromide, silicon tetrachloride, titanium tetrachloride, chromyl chloride, chlorine, bromine, fluorine, hydrogen chloride, hypochlorous acid, perchloric acid, chlorine dioxide, fuming sulfuric acid, sulfur dioxide, sulfur trioxide, nitric acid, nitric oxide, nitrous oxide, nitrogen oxychloride, nitrosyl chloride, hydrogen sulfide, ferric nitrate, etc. Carrier gases (i.e., gases which do not interfere with the action of the inorganic agent) such as nitrogen or carbon dioxide, may be employed to facilitate transport to the electrode gap of the vapor of the inorganic agent, particularly those agents which are not gaseous at room temperature and atmospheric pressure.

The treatment of this invention can be effectively applied to essentially any polymeric shaped structure. As representative polymeric shaped structures, the surfaces of which are susceptible to the treatment herein described, there may be mentioned shaped structures of perfluorocarbon polymers, vinyl fluoride polymers, vinylidene fluoride polymers vinyl chloride polymers, vinylidene chloride polymers, vinyl acetate polymers, polyolefins such as polyethylene, polypropylene and polybutene-1, polystyrene, linear polyesters such as polyethylene terephthalate, polyamides, acrylonitrile polymers, acrylate and methacrylate polymers, polyurethanes, polycarbonates, regenerated cellulose, cellulose acetate, cellulose ethers, polyacetals, polyspiroacetals such as those derivable from pentaerythritol and dialdehydes, coumaroneindene resins, epoxy resins, phenolaldehyde resins, ureaformaldehyde resins, melamine, formaldehyde resins, isocyanateresins, protein plastics, etc. The treatment is applicable to any shaped structures, for example, films (both self-supporting and supported), fibers, and expanded structures, such as the foamed polyurethanes, vinyls, expandable polystyrene cellular polyethylene, foamed phenolics, cellular cellulose acetate and foamed silicones and polyethers.

The mechanism by which the surface modifications of this invention are produced is not well understood at this time. However, it is speculated that in the case of a halogen-containing substrate, for example, and with an inorganic agent such as boron trifluoride, the boron trifluoride may well coordinate with one of the halogen atoms of the substrate and under the influence of the energy of the electrical discharge the resulting complex may be dislodged from the surface of the shaped structure, leaving an unsaturated site. Similarly, an oxidizing agent such as chlorine may function under similar conditions to dislodge hydrogen atoms from the surface of the polymeric substrate.

The following specific examples of certain preferred embodiments will serve to further and more fully illustrate the principles and practice of this invention.

EXAMPLE 1

A one-mil film (50 inches wide) of oriented polyvinyl fluoride was passed at a speed of 25 feet per minute between a pair of electrodes connected to a high frequency spark generator (Model HFSG—High frequency spark generator—Lepel High Frequency Laboratories, Inc.), one electrode of which was stationary and the other was a rotating metal roll covered to a thickness of 20 mils with "Mylar"[1] polyester film. The electrodes were spaced .04 inch apart and the power setting of the generator was set at 70 corresponding to a current of approximately 1.3 RF amperes to the electrodes. Contact time corresponded to $4\times10^{-4}$ seconds. The film was passed through a set of rubber nip rolls just prior to its passage between the electrodes to remove the boundary layer of air on the film. The chamber enclosing the assembly was flushed with nitrogen at the outset. An atmosphere of boron trifluoride (3 cu. ft./min.) was maintained between the electrodes at substantially atmospheric pressure in the manner shown in the attached drawing. The film treated in this way showed a contact angle of 39°. A similar film not treated showed a contact angle of 75°. To test the adherability of the treated surface, a layer of adhesive comprising 10 parts of Epon 828 and 3 parts Epon U (Shell Chemical Co.) was spread on the surface and the surfaces bearing the adhesive were pressed together for 10 minutes at 120° C. at a pressure of 75 pounds per square inch. The laminates were then placed in boiling water and the length of time to failure was noted.

A laminate of the film treated as described above showed no evidence of failure after boiling for 1000 hours. A similar film treated as described above at 175 feet per minute, corresponding to a contact time of $5.7\times10^{-5}$ seconds showed a contact angle of 53°; its laminate likewise showed no evidence of failure after boiling for 1000 hours.

For comparison, a similar film was passed at a speed of 25 feet per minute ($4\times10^{-4}$ seconds contact time) through the apparatus described above except that the vapor of boron trifluoride was omitted. The treated film had a contact angle of 51° but its laminate failed in the boiling test after 2 hours.

For still further comparison, a similar film subjected for one second in an atmosphere of boron trifluoride alone had contact angles between 67° and 70° and its laminate failed in the boiling test after about five hours. Exposure of the film for 15 seconds gave films with contact angles between 53° and 56° and with good boiling resistance in laminates but the longer contact time required is a disadvantage for commercial processing.

Determination of contact angle

Contact angle which serves herein as a measure of the wettability of the polymeric surface may be defined as $$\frac{\theta_a+\theta_r}{2}$$

where $\theta_a$ is the advancing contact angle and $\theta_r$ is the receding contact angle. The procedure is as follows: Handling the film only with tweezers, a one-half inch by one-inch sample thereof is washed briefly in deionized water and then similarly in methyl ethyl ketone, followed by drying in a circulating air oven for about ten minutes at 60° C. After exposing the sample to a radioactive static eliminator and brushing off any dust with a small camel's

---

[1] Du Pont trademark.

hair brush it is placed in the center of the specimen platform of a contact angle goniometer. The contact angle goniometer consists essentially of a microscope mounted with its axis horizontal, equipped with a mechanical stage (the specimen block) that can be raised and lowered or moved from side to side. The normal eye piece of the microscope is replaced with a protractor eye piece which is divided into degrees on a rotating scale with a vernier in minutes on a fixed arm. The cross hairs in the eye piece divide the field of view into quadrants. A drop of deionized water is pushed onto the film surface from a capillary dropper mounted above the stage. The capillary dropper is made from an ordinary eye dropper by drawing the tip into a one-inch long capillary with a diameter just small enough to prevent water from running out of the tube under gravitational force only. To assist in dispersing liquid from the dropper the tip of the capillary is ground about 30° off the perpendicular. The protractor scale is then revolved until its cross-hair is parallel to the surface on which the drop is resting. The other cross-hair is adjusted until it is tangent to the drop at the point of contact with the surface on which it is resting. The angle between the cross-hairs inside the drop is read from the protractor scale. This is the advancing contact angle $\theta_a$. Using the capillary dropper, water is subtracted from the drop on the film sample and the receding contact angle is recorded. For both advancing and receding contact angles the drop perimeter must move and to insure this the drop is viewed as water is being added or subtracted. Due to water evaporation, an advancing water drop will begin to recede within about 30 seconds after it has stopped advancing. Therefore, the advancing contact angle must be measured soon after the drop perimeter has stopped moving. A receding drop may take as much as 30 seconds to come to equilibrium after subtraction of water has stopped. Since water evaporation merely causes more water loss and does not affect the receding contact angle it is best to wait about 30 seconds before taking this reading.

EXAMPLES 2–11

In the following examples, the procedure followed was the same as described in Example 1 with the exception that a set of nip rolls was not used to remove the boundary layer of air. Film speed was five feet per minute; film thickness was 0.5 mil in all cases. For inorganic agents which were not gaseous at room temperature, a carrier gas such as nitrogen was bubbled through the inorganic liquid and at a rate of approximately four cubic feet per minute to provide an atmosphere of a given inorganic agent between the electrodes. The results are shown in the following table:

TABLE I

| Example No. | Inorganic Agent | Contact Angle | Laminate Adhesive Bond |
|---|---|---|---|
| 2 | BF$_3$-etherate (diethyl ether). | 56° | CNS.[1] |
| 3 | BF$_3$-hydrate | 32° | CNS.[1] |
| 4 | Fuming sulfuric acid (nitrogen carrier). | 56° | CNS.[1] |
| 5 | Nitric Acid | 45° | CNS.[1] |
| 6 | Nitric Oxide | 51° | CNS.[1] |
| 7 | Nitrous Oxide | 52° | CNS.[1] |
| 8 | Hydrogen Sulfide | 55° | CNS.[1] |
| 9 | Hydrogen Chloride | 58° | CNS.[1] |
| 10 | Sulfur Dioxide | 68° | CNS.[1] |
| 11 | Control (No Treatment) | 75° | Easily peeled. |

[1] Cannot start delamination. Test involves scoring film with sharp knife and trying to pry up and peel back on edge of the film. A "good" laminate is one in which this peeling cannot be started.

EXAMPLE 12

Following the procedure of Example 1, a 5-mil thick film (18 inches wide) of a tetrafluoroethylene/hexafluoropropene copolymer (weight ratio 85/15) of the type described by Bro and Sandt United States Patent 2,946,763, was drawn through the apparatus at a rate of 10 feet per minute in the atmosphere of boron trifluoride. The treated film showed a contact angle of 43° compared to a film which had not been treated which had a value of 72°. A laminate was prepared by applying an adhesive layer of 10 parts Epon 828 and 3 parts Epon U to the surfaces which were then dried at 105° C. for five minutes and then laminated film-to-film at 200° C. for 30 seconds. The samples were then cut into one-inch strips and pulled on a Suter tester. The treated film showed a peel strength of over 3000 grams per inch, whereas the film which had not been treated showed a peel strength of only 100 grams per inch.

EXAMPLE 13

Using the same apparatus as described in Example 1, a 3-mil thick film of "Mylar" polyester film was treated with chlorine in the electric discharge. The resulting film, sealed at 190° C. and 20 pounds per square inch pressure at a two second dwell time showed a seal strength of 875 grams/1½″ wide film and laminates made from films heat sealed to each other were not degraded in strength by immersion in water for 48 hours. A similar film which was not treated in the same way could not be heat sealed below the melting point of the film. A parallel result was obtained when sulfur dioxide was used in place of chlorine.

EXAMPLE 14

Using the same apparatus and following the same procedure of Example 1, a one-mil polypropylene film (7 inches wide) which had been two-way stretched was treated at a speed of about 50 feet per minute ($2\times10^{-4}$ seconds contact time) to the action of the electric discharge in an atmosphere of chlorine. The treated film showed a contact angle of 73° whereas a control which had not been treated showed a contact angle of 92°. The film was immersed in a 3% aqueous solution of dyestuff ("Latyl" Red M.G.; E. I. du Pont de Nemours & Co.) for two hours at 80° C. The treated film showed excellent affinity for the dyestuff, whereas a film which had not been treated showed practically no adherence of the dye. A coating of a vinylidene chloride/acrylonitrile copolymer (90:10) showed excellent adhesion to the treated film; adhesion of the same coating to a non-treated film was very poor. Similarly a coating of branched polyethylene showed excellent adhesion to the treated film.

EXAMPLE 15

The procedure of Example 14 was repeated with the exception that polyethylene film (19 inches wide) was substituted for polypropylene film and the film was passed through the apparatus at a rate of 300 feet per minute corresponding to a contact time of $3.3\times10^{-5}$ seconds. Samples of the resulting film showed contact angles between 48° and 56°, whereas the film before treatment showed a contact angle of 90°. A coating of a vinylidene chloride/acrylonitrile copolymer (90:10) showed excellent adhesion to the treated film; samples sealed and pulled on the Suter tester gave values above 1500 grams per inch when the film was sealed with the coated surface to coated surface or coated surface to uncoated surface. A similar film which was not treated showed very poor adhesion to the same coating with heat seal values below 250 grams. A similar film which was subjected to the electric discharge treatment in the absence of chlorine and with the same coating applied showed good heat seal values when the film was sealed with the coated surface to coated surface, but attempts to seal the coated surface to the uncoated surface which is necessary in the fabrication of many types of packages gave a very poor heat seal bond.

EXAMPLE 16

A film (18 inches wide) of regenerated cellulose containing 15% glycerol was passed through the apparatus of Example 1 at a rate of 50 feet per minute with 3 cubic feet per minute of boron trifluoride being supplied to the electrodes. The effect of this treatment on the surface properties of the regenerated cellulose film was determined as follows: A mark of a wax pencil was drawn across the surface of the treated film and also across the surface of a similar film which was not treated. The two films were then immersed in water at 25° C. The wax coating loosened from the base sheet of the untreated film within 1½ minutes. The corresponding wax coating on the treated sheet was retained for 6 minutes before it separated from the base film. This test is correlatable with the degree of adhesion of typical coatings applied on regenerated cellulose films. For example, a coating of polyethylene showed excellent adhesion to the treated film.

EXAMPLES 17–26

The following examples were carried out according to the procedure described in Example 1. The films (6 inches wide) of the various polymers were passed through the apparatus at a rate of approximately 50 feet per minute corresponding to contact time of approximately $2 \times 10^{-4}$ seconds. The inorganic vapor was introduced between the electrodes at a rate of about 4 cubic feet per minute. Nitrogen was used as a carrier and inorganic agents which were solid at room temperature, were warmed to provide sufficient vapor for the treatment. The resulting treated films and corresponding controls shown in the following table were examined for visible wettability, adherability and dyeability. The samples were determined to be wettable if a drop of water placed on the surface spread immediately over the surface; they were judged to be not wettable if the droplets remained on the surface essentially in hemispherical shape and showed no tendency to spread. To test adherability, laminates were made with Swift Co. X7071 adhesive and the laminates were then pulled apart on a Suter tester. Dyeability was determined following the procedure described in Example 14.

The results are shown in the following table:

It will be evident from the foregoing description and examples that the present invention provides a simple, efficient, and economic method for enhancing the surface characteristics of polymeric shaped structures in general with a resultant improvement in the application of these structures and in many instances a much wider field of utility for the treated structure. This invention is particularly advantageous in treating film structures to improve adherability, wettability, printability and the like, and to reduce the objectionable static propensity characteristic of many polymeric films.

I claim:

1. A process for modifying and improving the surface characteristics of polymeric shaped structures which comprises subjecting the surface of a polymeric shaped structure to the action of an electrical discharge at substantially atmospheric pressure between spaced positive and negative electrodes in a gaseous atmosphere consisting essentially of the vapor of an inorganic agent having an affinity for electrons and having a vapor pressure of at least one millimeter of mercury at 60° C., said electrical discharge having an average energy level below 15 electron volts.

2. A polymeric film treated by the process of claim 1.

3. The process of claim 1 wherein the polymeric shaped structure is a fluorocarbon polymer film.

4. A process for modifying and improving the surface characteristics of polymeric film which comprises passing continuous polymeric film between spaced positive and negative electrodes while maintaining between said electrodes an electrical discharge and a gaseous atmosphere at substantially atmospheric pressure consisting essentially of the vapor of an inorganic agent having an affinity for electrons and having a vapor pressure of at least one millimeter of mercury at 60° C., said electrical discharge having an average energy level below 15 electron volts.

5. A process for modifying and improving the surface characteristics of continuous polymeric film which comprises continuously passing a continuous polymeric film between parallel positive and negative electrodes spaced to provide a gap therebetween of from 0.03 to 0.125 of an inch, continuously applying to said positive electrode an alternating current of from 0.3 to 3.5 R.M.S. amperes at a voltage in excess of 2000 volts, and at a frequency in the range of 300,000 to 500,000 cycles per second effective to create an electrical discharge therebetween, and maintaining between said electrodes a gaseous atmosphere at substantially atmospheric pressure consisting essentially of the vapor of an inorganic agent having an affinity for electrons and having a vapor pressure of at least one millimeter of mercury at 60° C., whereby to expose a surface of said film to the action of said electrical discharge and said gaseous atmosphere, said film being passed between said electrodes at a speed effective to expose a surface

TABLE II

| Example No. | Polymer | Inorganic Agent | Wettable | Adhesive Bond (grams/inch) | Dyeable |
|---|---|---|---|---|---|
| 17 | Polyacrylonitrile | Sulfur Dioxide | Yes | | Yes. |
| | | Control [1] | No | | No. |
| 18 | Polyvinyl Chloride | Aluminum Trichloride | Yes | 2,500 | |
| | | Control | No | 300 | |
| 19 | Polycarbonate (Lexan—Gen. Elec.) | Chlorine Dioxide | Yes | 3,000 | |
| | | Control | No | 500 | |
| 20 | Polyvinyl Acetate | Chromyl Chloride | Yes | 2,500 | |
| | | Control | No | 250 | |
| 21 | Cellulose Acetate | Hypochlorous Acid | Yes | 2,500 | |
| | | Control | No | 300 | |
| 22 | Polyurethane (toluene-2,4-diisocyanate/ tetramethylene glycol). | Sulfur Trioxide | Yes | 3,500 | |
| | | Control | No | 350 | |
| 23 | Polystyrene | Perchloric Acid | Yes | 2,500 | Yes. |
| | | Control | No | 350 | No. |
| 24 | Polymethyl methacrylate | Bromine | Yes | 2,500 | Yes. |
| | | Control | No | 400 | No. |
| 25 | Polyvinylidene Chloride | Aluminum Tribromide [2] | Yes | 3,200 | |
| | | Control | No | 400 | |
| 26 | Polyethylene | Sulfur Dioxide and Chlorine | Yes | 2,500 | |
| | | Control | No | 500 | |
| 27 | do | Fluorine [3] | | | |

[1] No treatment.
[2] Treated film showed considerably lower static susceptibility.
[3] Contact time about one second. Treated film had contact angle of 108° and showed excellent greaseproofness. Film before treatment had contact angle of 90° and was not greaseproof.

of said film to the action of said electrical discharge for a period of at least $4 \times 10^{-4}$ seconds.

References Cited by the Examiner

UNITED STATES PATENTS

| 2,939,956 | 6/1960 | Parks | 204—169 |
| 3,030,290 | 4/1962 | Ryan | 204—169 |
| 3,057,792 | 10/1962 | Frohlich | 204—165 |
| 3,057,795 | 10/1962 | Frohlich | 204—312 |

JOHN H. MACK, *Primary Examiner.*

WINSTON A. DOUGLAS, *Examiner.*

H. S. WILLIAMS, *Assistant Examiner.*